May 26, 1942.  E. I. GREEN ET AL  2,284,612
PHASE CONTROL IN ELECTRICAL TRANSMISSION
Filed Jan. 6, 1940    10 Sheets-Sheet 2
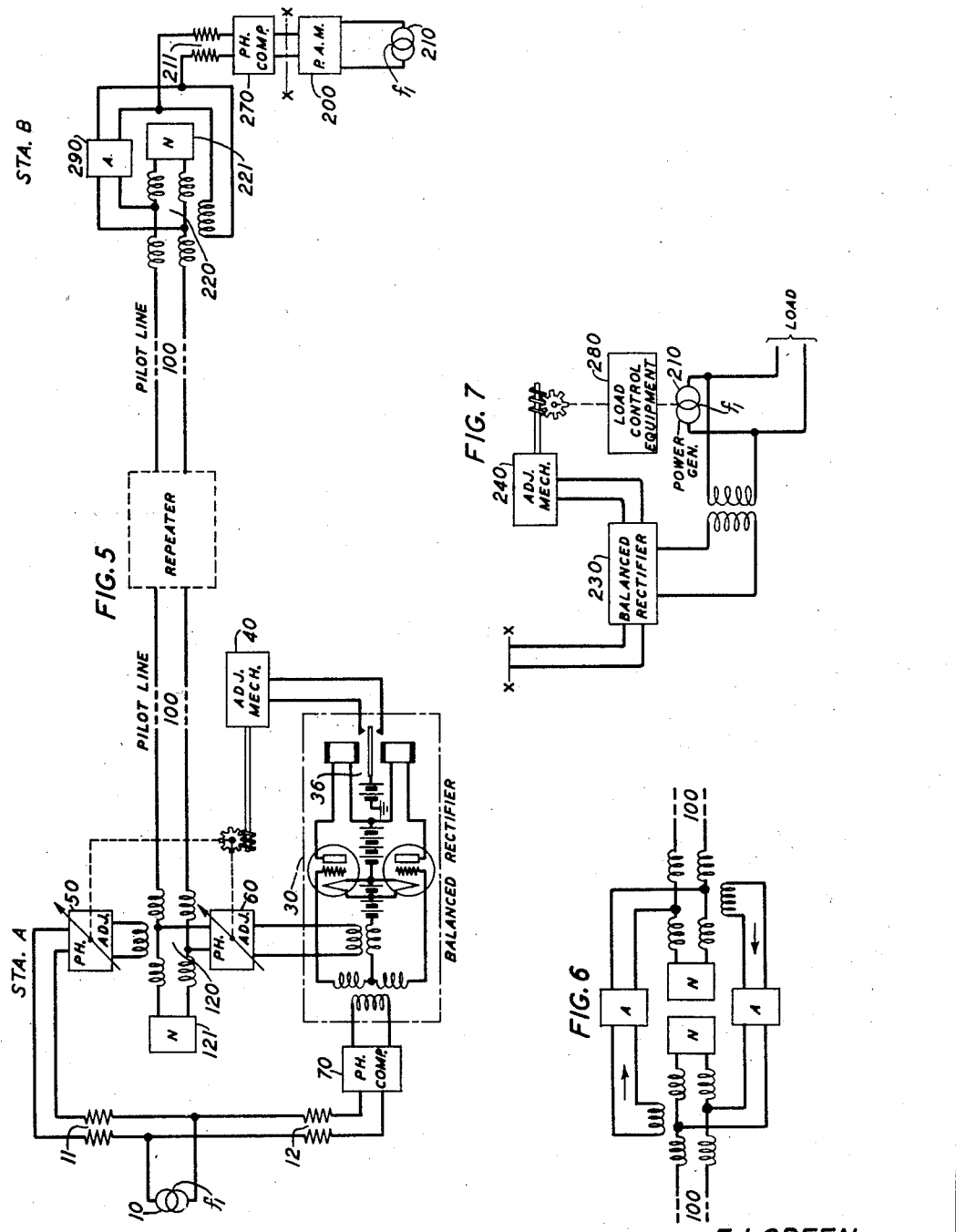
INVENTORS: E. I. GREEN
N. MONK
BY
*William R. Ballard*
ATTORNEY

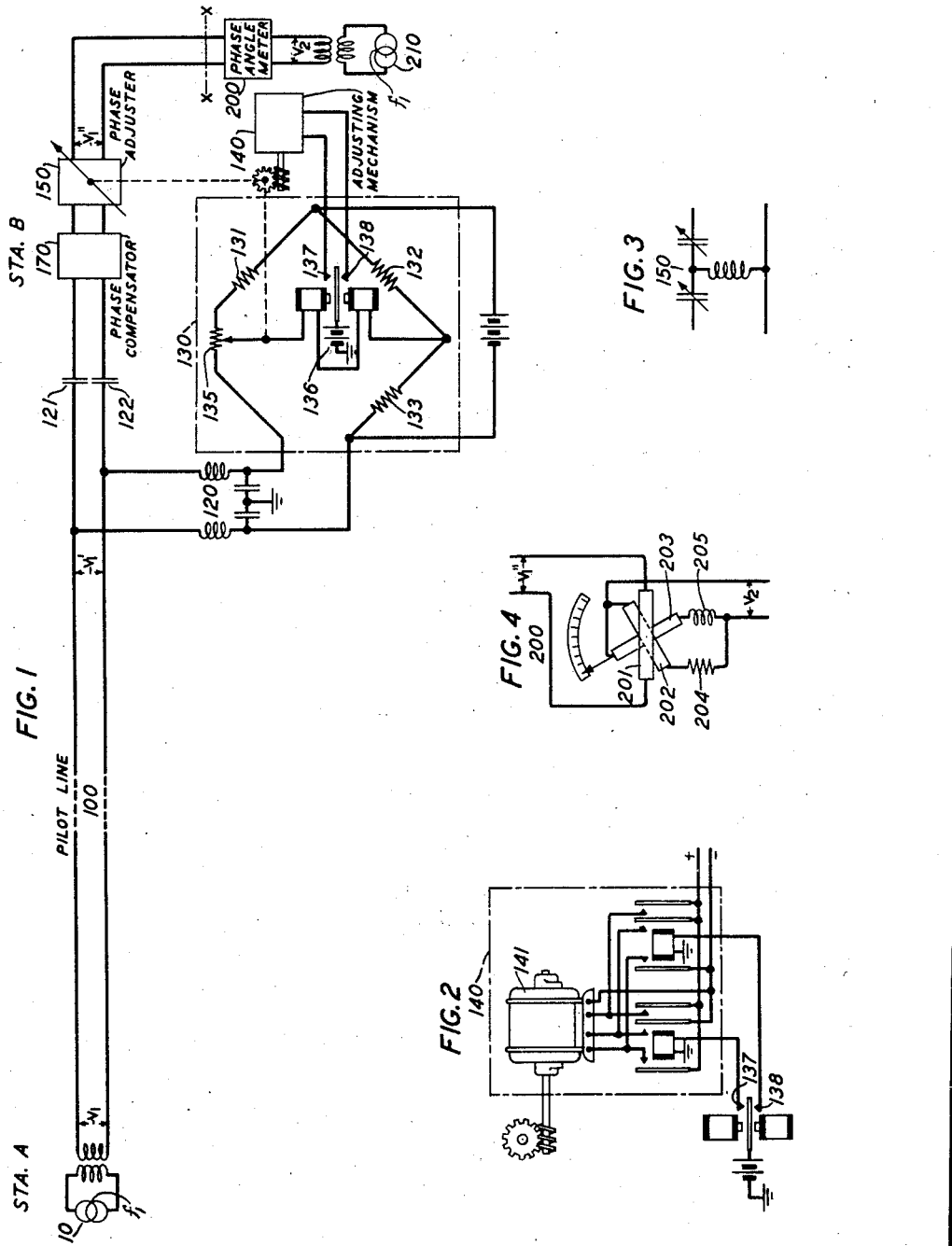

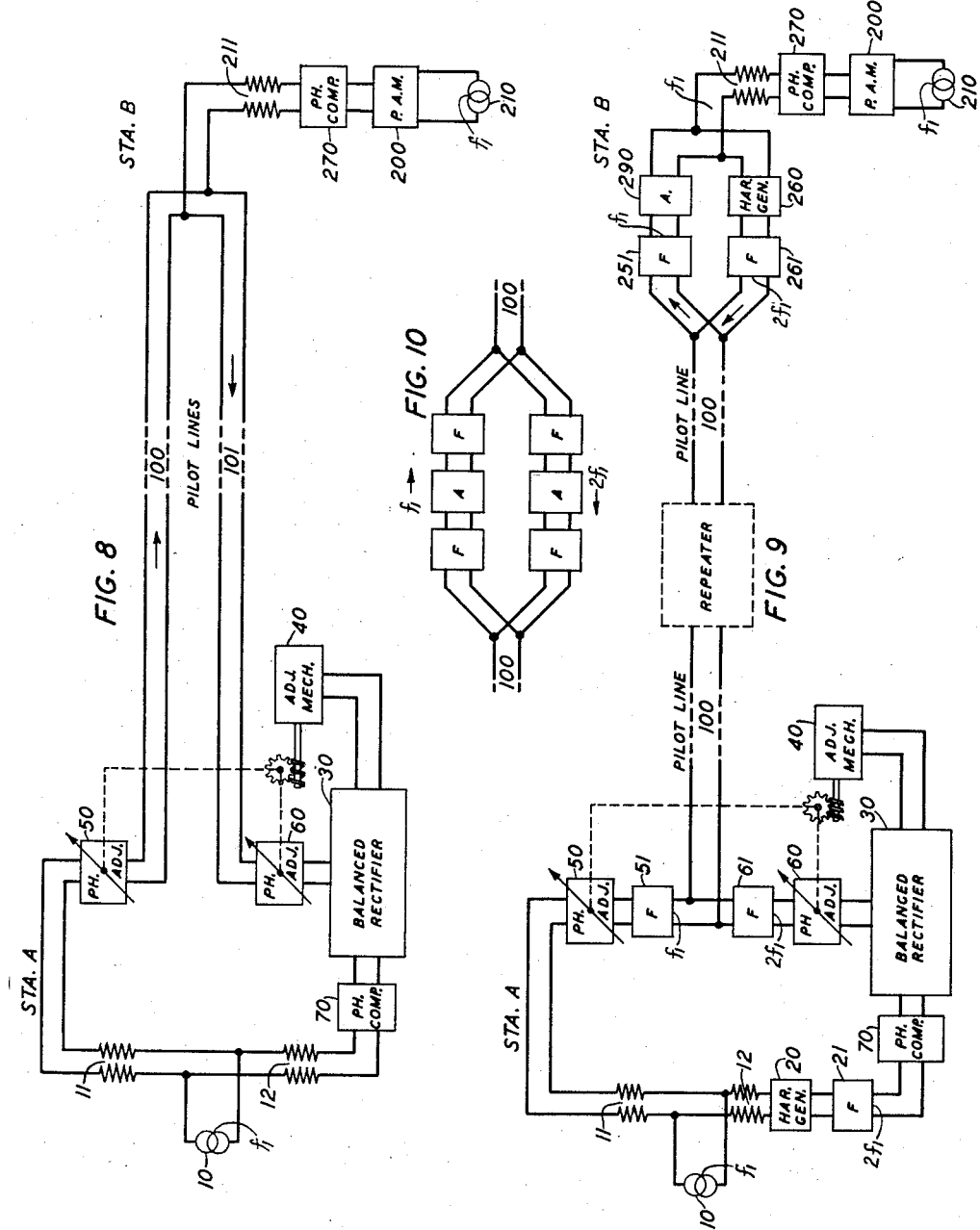

May 26, 1942.   E. I. GREEN ET AL   2,284,612
PHASE CONTROL IN ELECTRICAL TRANSMISSION
Filed Jan. 6, 1940   10 Sheets-Sheet 4

INVENTORS: E.I. GREEN
N. MONK
BY
ATTORNEY

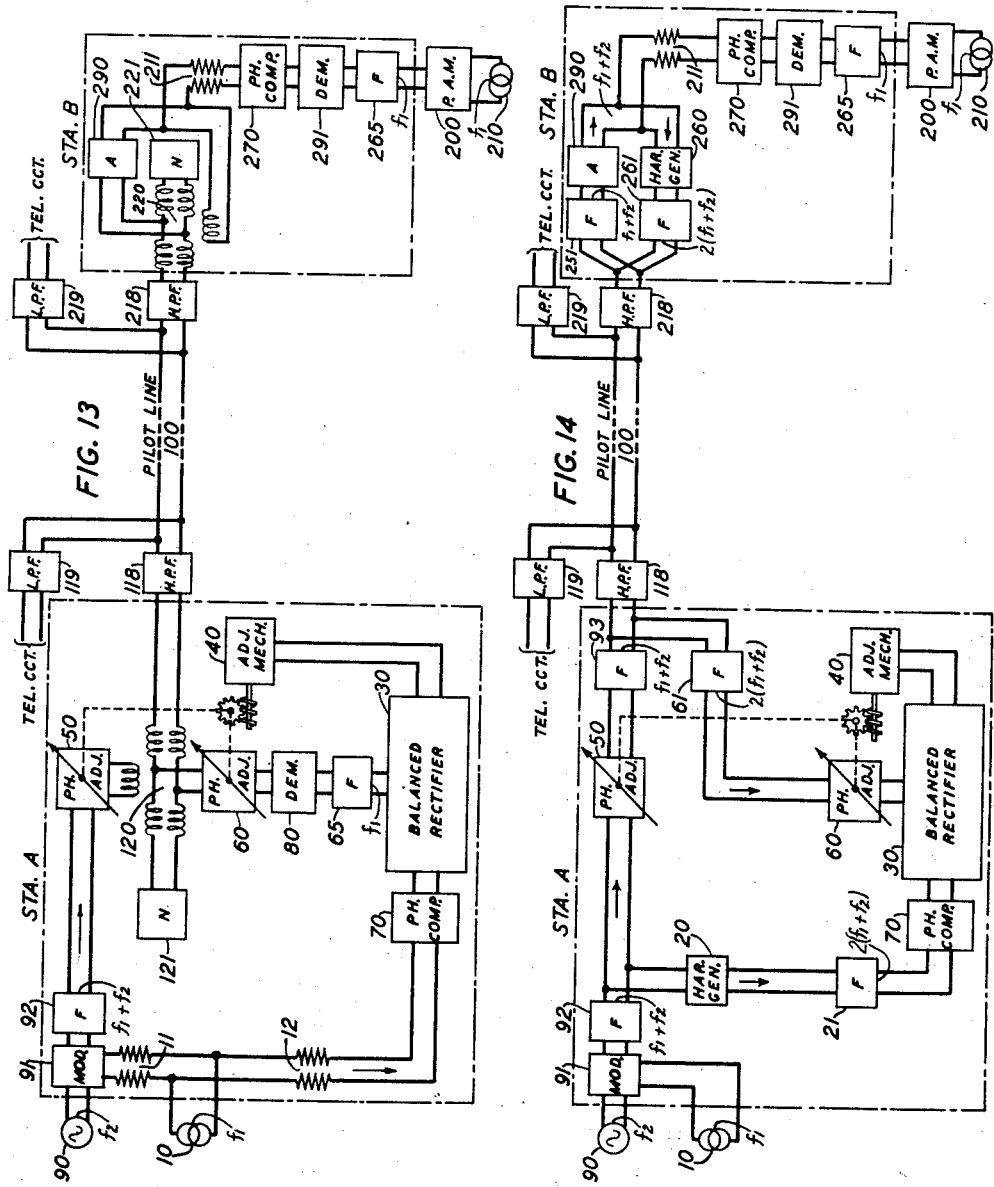

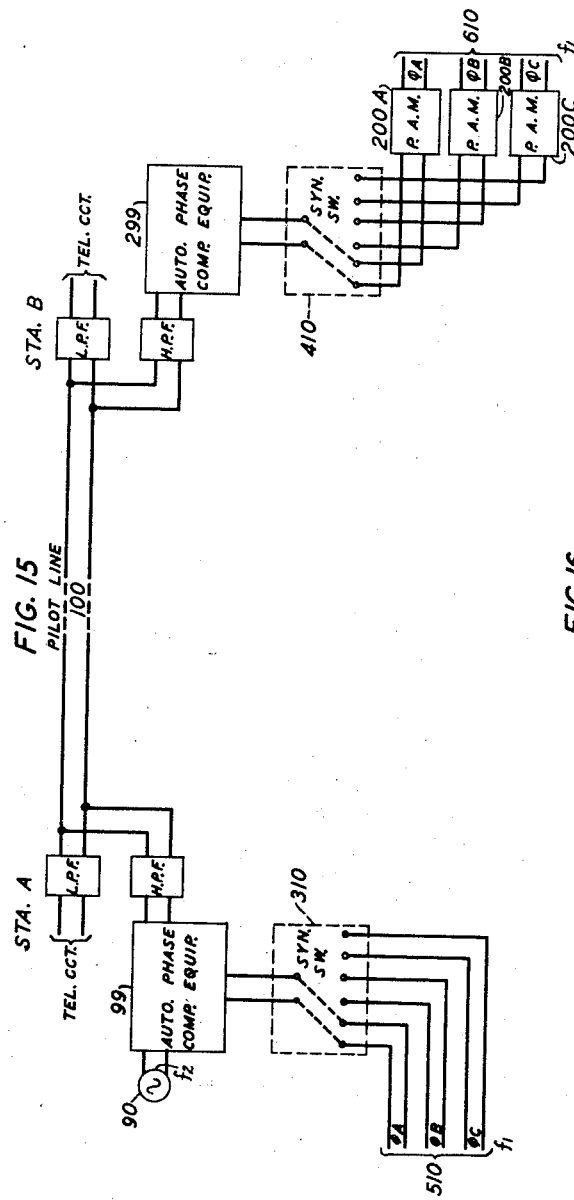
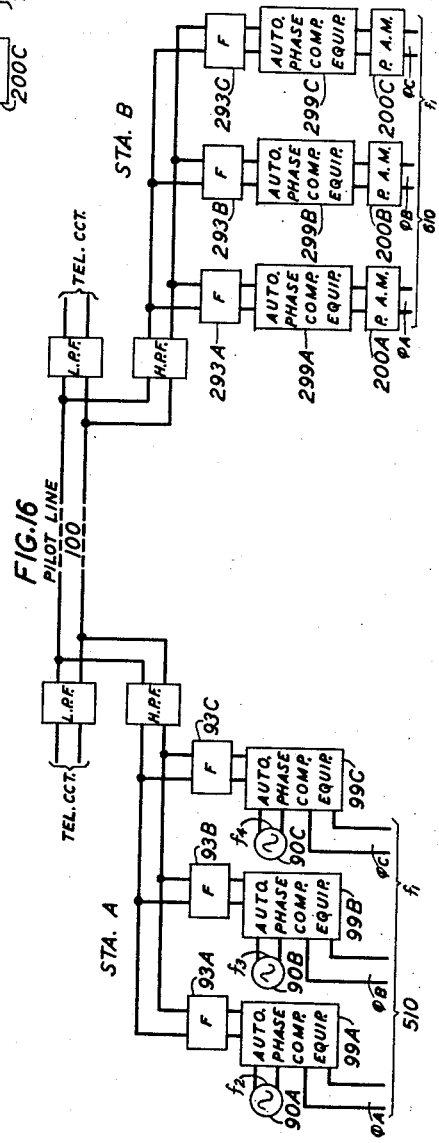
FIG. 15
FIG. 16
INVENTORS: E. I. GREEN
N. MONK
BY
William R. Ballard
ATTORNEY

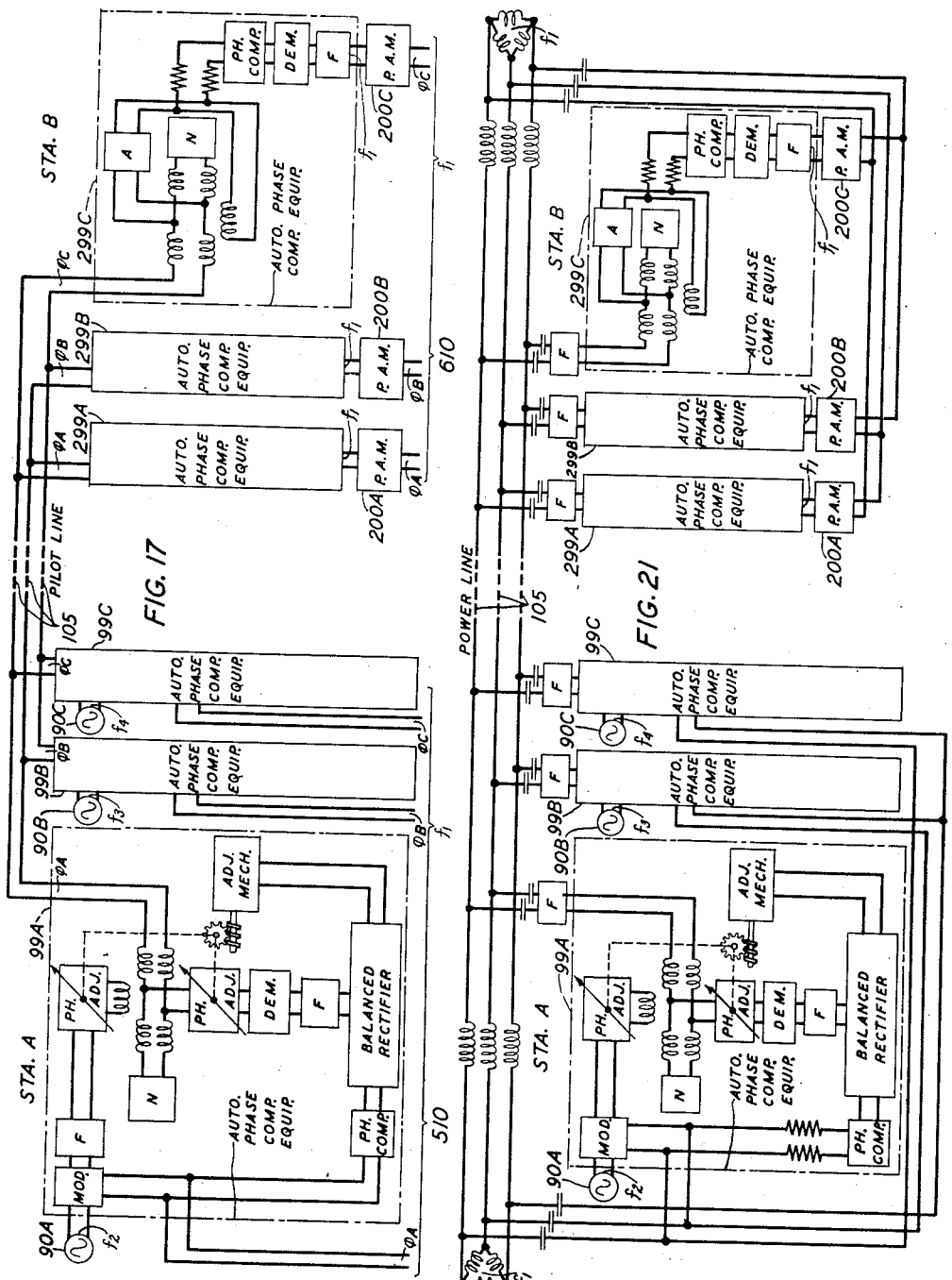

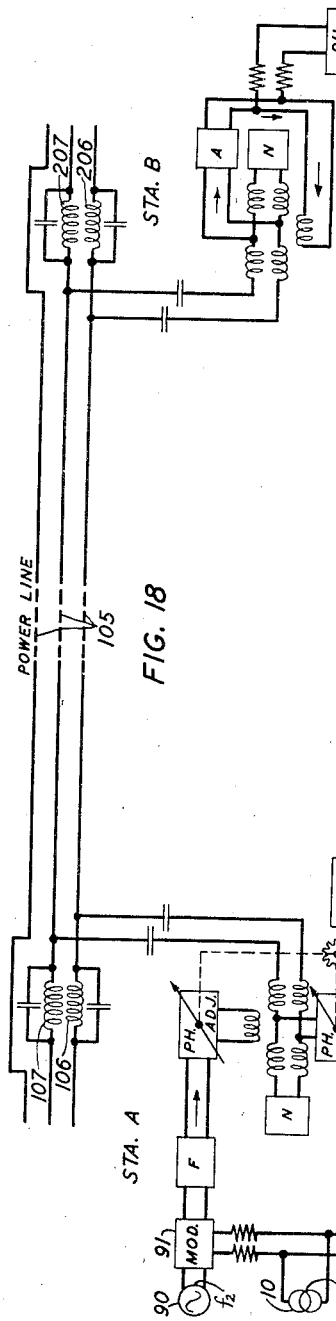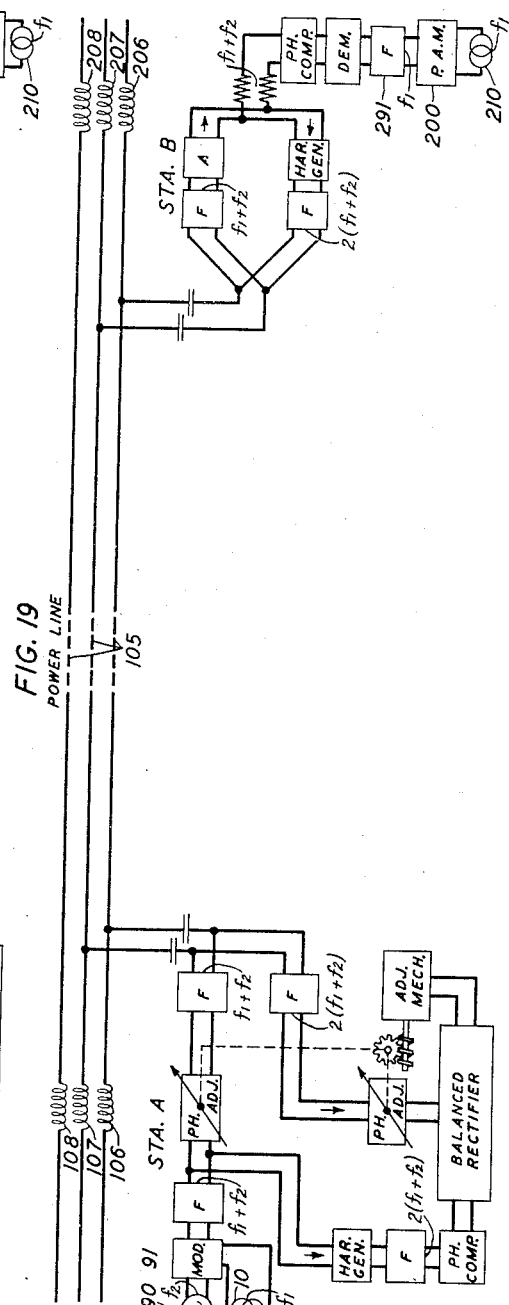

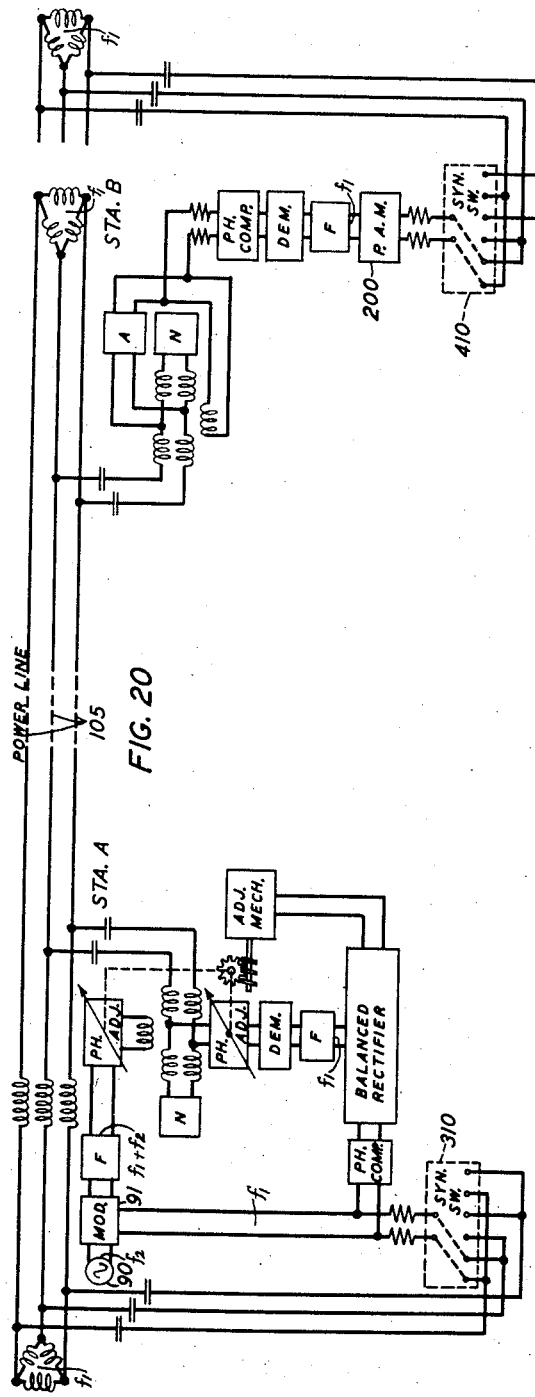
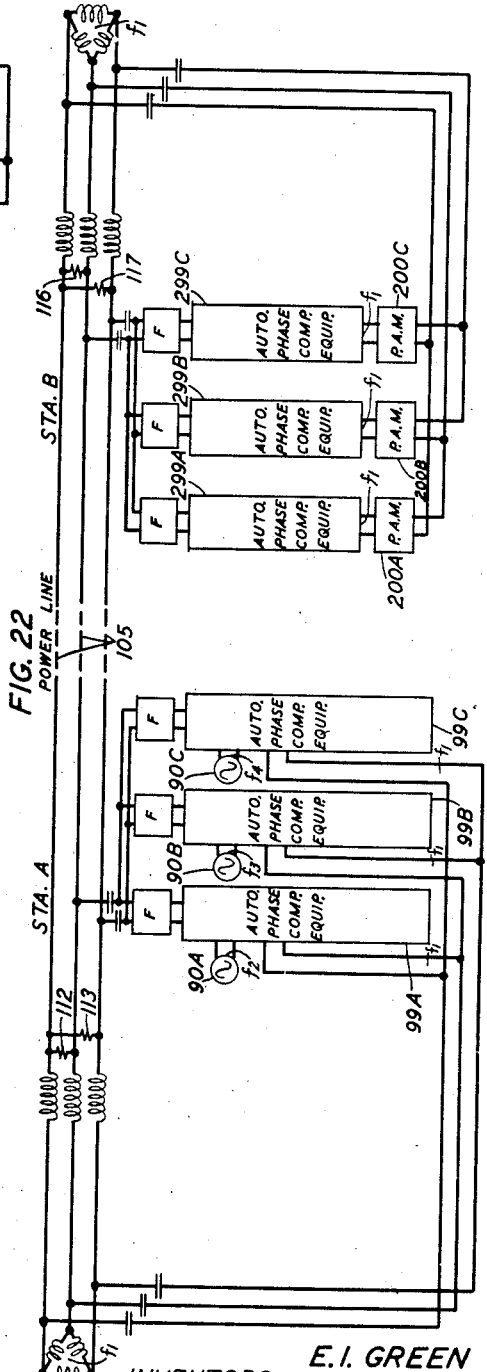

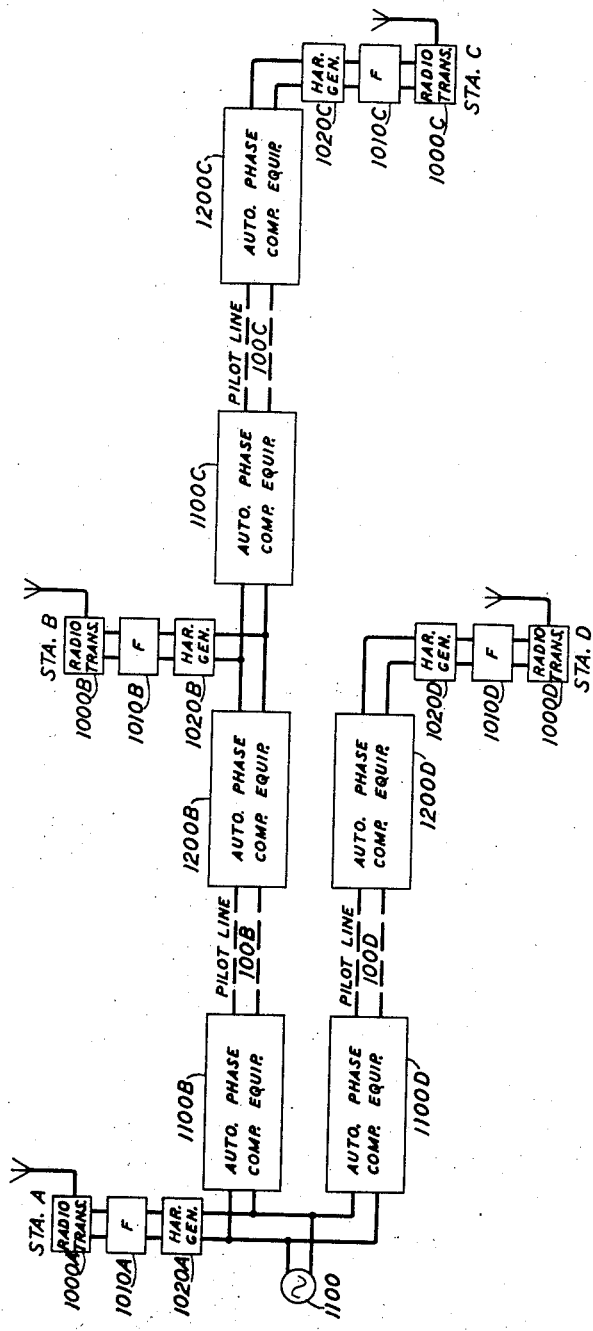

Patented May 26, 1942

2,284,612

UNITED STATES PATENT OFFICE 2,284,612

PHASE CONTROL IN ELECTRICAL TRANSMISSION

Estill Ibbotson Green, Short Hills, N. J., and Newton Monk, New York, N. Y., assignors to American Telephone and Telegraph Company, a corporation of New York Application January 6, 1940, Serial No. 312,792

14 Claims. (Cl. 178—44)

This invention relates to methods and means for compensating for phase changes of a transmission line and to their application for any desired use, examples being for automatically controlling voltage regulation and load distribution of power systems and to phase synchronization of broadcast transmitters.

An object of this invention is to maintain constant phase shift in a transmission circuit.

Another object is the continuous and accurate measurement of phase change between two widely separated currents or voltages.

Another object is to maintain a constant phase relationship between the currents or the voltages at two points separated by an appreciable length of line.

Another object is to maintain identical phase of the carrier frequency of a plurality of common frequency broadcast stations or identical phase relationship of the currents or voltages in different systems.

Another object is to provide a simple and continuously operating system for controlling in accordance with phase relationship the voltage regulation and load distribution in power systems.

Another object is to provide for relative phase control of certain operating factors as between different parts of a power system or as between different power systems.

A further object is to provide means for automatically carrying out the above-named objects.

Frequency synchronization in electrical systems is a usual requirement, while phase synchronization is not always necessary. This invention embraces the general problem of maintaining constant phase shift for a substantial length of line and is directed to methods and means for automatic compensation of variations in phase change of transmission lines, thereby securing constant phase shift.

In applying this invention to the control of other systems a phase compensated pilot line or the equivalent is generally employed in determining the difference in phase of a voltage delivered to the phase compensated circuit at one point with that of a local source at another point by connecting a phase angle meter or other suitable device between the local source and the pilot line reaching this point.

The phase shift characteristic of a line of appreciable length, for instance, such as might be used as a pilot line, does not remain constant with time but varies with changing temperature and weather conditions. For cable circuits the variation in phase shift is due to temperature changes which affect principally the resistance and to a lesser extent other circuit constants. For open-wire lines the changes in phase result largely from changes in leakage conductance of the insulators, although temperature effects are also important.

Compensation for variations in phase change of a line as disclosed herein may be brought about by three different methods:

(1) Direct current method;
(2) Alternating current method; and
(3) Carrier current method.

The direct current method is primarily applicable to cable circuits. Further, the arrangement is best adapted to cable circuits operating at relatively low frequencies. This method comprises maintaining constant phase shift for substantial length of line circuits by taking advantage of the relation of the phase shift to resistance. This relationship may be mathematically expressed. For cable circuits at low frequencies, the propagation constant is given by the following approximate formula:

$$\gamma = \alpha + j\beta = .707\sqrt{RC\omega} + j.707\sqrt{RC\omega} \qquad (1)$$

Since the capacitance $C$ changes very little with temperature, it will be seen that the change in the phase shift $\beta$ results largely from the change in resistance.

In the first arrangement here shown, the variation in phase shift of the line circuit is automatically compensated through the agency of a self-balancing Wheatstone bridge circuit. This arrangement employs direct current to effect the phase compensation of the line. The results obtainable by this first method are approximate while the latter two methods above mentioned are exact.

When it is desired to obtain constant phase shift on several circuits which are exposed to the same conditions, such as several circuits in the same cable, the arrangement applicable to one circuit may be slightly modified and one of the circuits which may be termed a pilot circuit may be used to correct the phase variations of all of the circuits. This avoids duplication of the compensating apparatus for each circuit.

The alternating current method is not limited to making approximate phase change correction on the basis of resistance variation only. It employs an alternating current in maintaining constant phase shift for substantial lengths of line circuits by an arrangement which obtains substantially perfect correction of phase change and is applicable alike to cable or to open-wire lines.

The carrier current method comprises maintaining constant phase shift for substantial lengths of line circuits by an arrangement which also obtains substantially perfect correction of phase change for whatever cause and is applicable alike to cable and to open-wire lines and particularly to high frequency operation. This arrangement employs a carrier current which is modulated by a low frequency current at the transmitting station for use in effecting the phase shift compensation of a line.

With any of the three methods the line can, with suitable arrangements, be used simultaneously for other purposes.

A description of a number of embodiments chosen for illustrating this invention in which reference is made in each case to the accompanying drawings follows:

Figure 1 shows an arrangement employing direct current for the automatic compensation of phase change variations of a line in which advantage is taken of the relation of the change in phase to the change in resistance.

Fig. 2 shows more in detail the automatically operated adjusting mechanism of Fig. 1 and of other figures.

Fig. 3 shows a possible type of circuit arrangement for the phase adjuster of Fig. 1 and of other figures.

Fig. 4 shows a typical circuit arrangement of the phase angle meter of Fig. 1 and of other figures.

Fig. 5 shows arrangements employing alternating current for the automatic compensation of phase change variations of the line in which a single pilot current of the same frequency is transmitted between two points in opposite directions over the same line using hybrid coils. This figure also shows how the arrangement may be employed to obtain comparisons of the phase relationship of voltages at the two different points.

Fig. 6 shows a hybrid coil type of line repeater.

Fig. 7 shows a possible arrangement for automatically controlling the voltage or load at a power station in accordance with the phase indications transmitted over a compensated line.

Fig. 8 shows an arrangement employing alternating current for the automatic compensation of phase change variations of a line in which a single pilot current of the same frequency is transmitted between two points in opposite directions over two different lines. This figure also shows how the arrangement may be employed to obtain comparisons of the phase relation of voltages at the two different points.

Fig. 9 shows an arrangement employing alternating current for the automatic compensation of phase change variations of a line using filters in which pilot currents of two different frequencies are transmitted between two points in opposite directions over the same line. This figure also shows how the arrangement may be employed to obtain comparison of the phase relationship of voltages at the two different points.

Fig. 10 shows a filter type line repeater.

Figure 11:
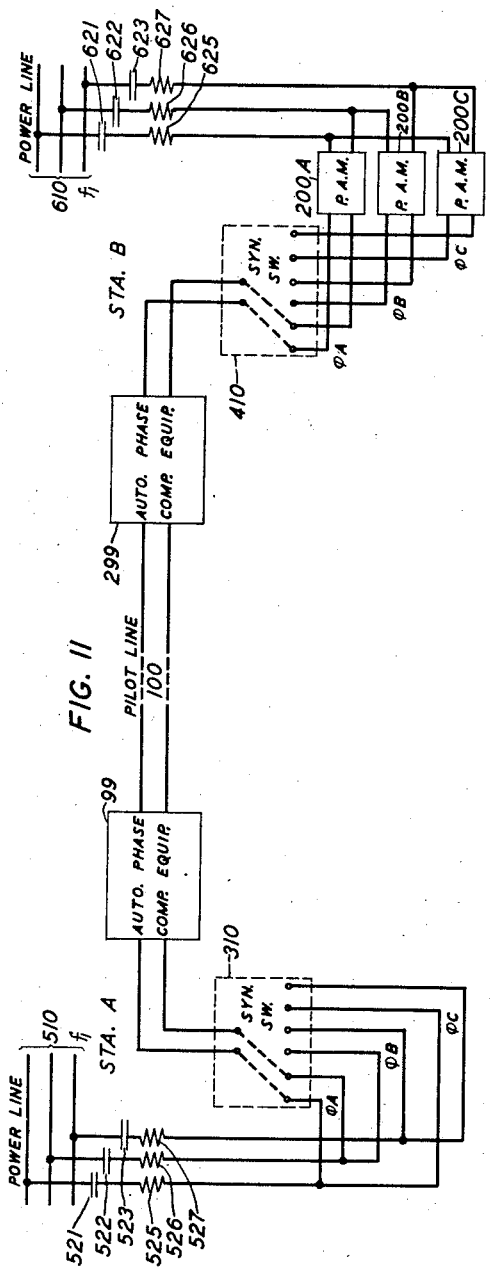

Fig. 11 shows an arrangement employing alternating current for automatically compensating a two-wire line for phase change variations between two points arranged for making successive phase comparisons of the voltages of all three phases of a power system or systems at the two points between which the compensated pilot line extends. Synchronous switching mechanism is used to connect one phase after another.

Figure 12:
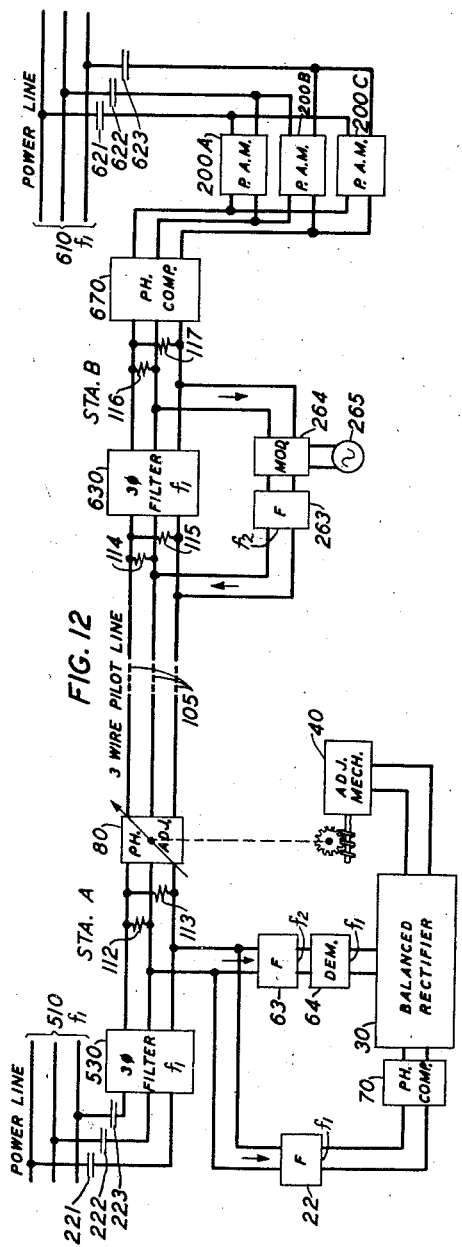

Fig. 12 shows an arrangement employing alternating current for automatically compensating a three-wire pilot line for phase change variations between two points arranged for simultaneous phase comparisons of the voltages of all three phases of a power system or systems at the two points between which the three-wire compensated pilot line extends. Suitable coupling means are employed to connect the pilot line with the power lines to simultaneously compare all three phases of the power system or systems.

Fig. 13 shows an arrangement employing carrier current for automatic compensation of phase change variations of a line in which a pilot current consisting of a carrier current modulated by a low frequency current is transmitted between two points in opposite directions over the line and illustrates how the arrangement can be employed for making comparisons of the phase relationship of independent voltages at two different points.

Fig. 14 shows an arrangement employing carrier current for automatic compensation of phase change variations of a line in which the pilot current in one direction consists of the carrier current modulated by a low frequency current and in the opposite direction of a harmonic frequency of the carrier current, thus using different pilot frequencies for transmission in opposite directions over the line and also illustrates how this arrangement can be employed for making comparison of the phase relationship of independent voltages at two different points.

Fig. 15 shows an arrangement employing carrier current for automatically compensating a pilot line for phase change variations between two points of a power system in which the carrier current modulated by the power current is transmitted over the automatically compensated pilot line and in which synchronous switching mechanism is used to connect in one phase after another of the power current for making phase comparison of the power current or voltages at two different points.

Fig. 16 shows an arrangement employing carrier current for automatically compensating a pilot line for phase change variations between two points in which three different frequency carrier currents modulated by the power current of the different respective phases of the power system are transmitted over the automatically compensated pilot line for simultaneously making phase comparisons of the power currents or voltages.

Fig. 17 shows an arrangement employing carrier current for automatically compensating a three-phase pilot line for phase change variations between two points arranged for making phase comparison of the currents or voltages of all three phases of a power system at two different points in which three different carrier currents are modulated by the power current of the different respective phases of the power system and are transmitted over the respective phases of the automatically compensated three-phase pilot line for simultaneously making phase comparison of the power currents or voltages.

Fig. 18 shows an arrangement employing carrier current for automatically compensating one phase of a three-phase power line for phase change variations between points in which the compensation is achieved by transmitting a modulated carrier current in opposite directions over the compensated one phase of the power line wire and arrangements at one point for making comparison of phase relationship of the currents or voltages at the two different points.

Fig. 19 shows an arrangement employing carrier current for automatically compensating one phase of a three-phase power line for phase change variations in which the compensation is achieved by transmitting a modulated carrier current in one direction and in returning a harmonic frequency thereof over the compensated one phase of the power line wire and arrangements at one point for making comparison of phase relationship of current or voltages at the two different points.

Fig. 20 shows an arrangement employing carrier current for automatically compensating one phase of a three-phase power line for phase change variations between two points in which compensation is achieved by transmitting a modulated carrier current in opposite directions over the compensated one phase of the power line wires between the two points and in which synchronous switching mechanism is used to connect in one phase after another of the power circuit for making phase comparison of the power current or voltages of the three-phase system at the two different points.

Fig. 21 shows an arrangement employing carrier current for automatically compensating all three phases of a three-phase power line for phase change variations between two points in which compensation is achieved by transmitting three different suitably modulated carrier currents in opposite directions over the compensated power line wires of each phase between the two points and arrangements at one point for making comparison of phase relationship of the current or voltages in the different phases of the power circuit at the two different points.

Fig. 22 shows an arrangement employing carrier current for automatically compensating one phase of a three-phase power line for phase change variations between two points in which comparison is achieved by transmitting three different modulated carrier current frequencies in opposite directions over the compensated one phase of a power line between the two points and arrangements at one point for simultaneously making comparison of the phase relationship of the currents or voltages of the different phases of the three phase power circuit at the two different points.

Fig. 23 shows an arrangement employing carrier current for automatically compensating for phase change variations of pilot lines interconnecting radio broadcast stations for achieving phase synchronization of broadcast transmitters employing common frequency carriers.

Similar reference characters refer to corresponding parts in the different figures of the drawings.

Fig. 1 shows an arrangement for the automatic compensation of phase change variations of a line in which advantage is taken of the relation of change in phase to change in resistance as expressed in Equation 1. In this arrangement, variations in phase shift of the pilot line 100 are automatically compensated through the agency of a self-balancing Wheatstone bridge circuit. At station A a source of current 10 provides alternating current for transmission over pilot line 100. In transmission over the line the current or voltage undergoes a certain phase shift and by means of a phase adjuster 150 the phase shift may be neutralized completely or partially. The pilot line 100 itself comprises one arm of the bridge 130, the resistance 131 which is made equal to the average resistance of the line forms a second arm, while resistances 132 and 133 are the other arms. Between the line and the resistance 131 is connected a variable resistance 135 for balancing the bridge. Across the opposite points of the bridge is connected a polar relay 136. When the resistance of the line 100 changes, this relay closes either its upper contact 137 or its lower contact 138, depending upon the direction of change. Automatic adjusting mechanism 140 then adjusts the resistance 135 until the bridge is once more balanced.

The automatic adjusting mechanism 140, shown more in detail in Fig. 2, is such that its motor 141 rotates in one direction when the upper contact 137 of the polar relay is closed and in the other direction when the lower contact 138 is closed. The motor of the adjusting mechanism is mechanically geared to the variable resistance 135 and also to the phase adjuster 150 so that in addition to rebalancing the bridge, the adjusting mechanism serves also to actuate the phase adjuster to compensate for the change in phase which accompanies the change in line resistance. Since only a single frequency is involved, the phase adjuster 150 may be quite simple.

The phase adjuster, for example, may be simply a variable condenser or inductance or it may be of a somewhat more complicated type. A possible type of phase adjuster is shown in Fig. 3. The total range of the phase adjuster 150 must be as great as the maximum variation in the phase shift of the line 100. Two or more sections like that shown in Fig. 3 may be used in series in case sufficient phase shift is not obtained in a single section.

In the circuit connecting the line with the bridge, a filter 120 is provided to keep the alternating current from the source 10 and other superfluous frequencies out of the bridge circuit. Condensers 121 and 122 are provided to isolate the receiving apparatus at station B from the bridge. Where it is desired to have the phase of the source 10 the same at the receiving point as that at the point of origin a phase compensator 170 may be inserted in the line to provide a constant phase shift opposite to the net phase shift introduced by the line and the phase adjuster 150. It is possible in most cases, however, to omit the phase compensator 170 and if necessary to calibrate the receiving apparatus accordingly. In order to determine the amount of phase shift to be provided by the phase compensator 170, it is necessary to know the phase shift of the line. This may be obtained from calibrations based on the fundamental constants of the circuit or measurements of the phase change may be made by employing one of the various methods discussed by Messrs. Nyquist and Brand in an article entitled "The measurement of phase distortion," published in the Bell System Technical Journal of July 1930, volume IX, commencing on page 522. With the exception of the open and short-circuit impedance method, which is applicable only to lines which are electrically short, all of the methods discussed by Messrs. Nyquist and Brand require that both ends of the circuit be available at the same location. This is usually achieved by employing two similar circuits, looping them together at the distant end and dividing the measured phase change by two. Where two similar circuits are not available, the method described in the copending application of Messrs. E. I. Green and N. Monk, Serial No. 259,494, filed March 3, 1939, now U. S. Patent No. 2,214,130 of September 10, 1940, may be employed.

The compensated pilot line provided by the arrangement shown in Fig. 1 may be used for indicating the difference in phase between the currents or voltages of two sources at stations A and B, respectively. At station A a source 10 and at station B a source 210 separately provide alternating current power of the same frequency. The separate sources may be supplying power to one transmission system or to two different transmission systems. In supplying power to the same or different systems the load distribution or its division as between the sources may be controlled in accordance with the phase angle displacement between the respective power currents or voltages. By the arrangement here shown, the phase angle between the two respective currents or voltages is indicated and variations in phase change in the pilot line which might give rise to false indications are eliminated. A voltage $V_1$ generated by the source 10 at station A after being transmitted over line 100 undergoes a certain phase shift and is now designated $V'_1$. By means of the phase adjuster 150 the phase shift may be neutralized completely or partially, as heretofore described, and after such neutralization of the phase shift has taken place is designated $V''_1$. This voltage $V''_1$ of known phase shift with respect to voltage $V_1$ generated by source 10 may be utilized for measuring the phase difference between voltage $V_1$ and $V_2$ generated by the sources 10 and 210 at stations A and B, respectively. The means for utilizing the received frequency after phase correction is shown in Fig. 1 as a phase angle meter 200. This meter may be used to indicate the difference in phase between the voltage $V''_1$ delivered by the phase correcting mechanism and the local voltage $V_2$.

The indications of the phase angle meter or of a recorder may be used as a guide for the control of load distribution between two generating stations whose voltages are being compared. Such control may be accomplished through manual adjustment of tap changers or other devices well known in the power industry. It is also possible, as discussed later, to utilize the phase relationship between the voltages of the two stations to obtain automatic voltage control.

The phase angle meter 200 may be of any well-known type such as, for example, the Tuma phase meter diagrammatically shown in Fig. 4. This arrangement consists of a fixed coil 201 within which two similar coils 202 and 203 rigidly set at right angles to each other are allowed to rotate freely. The voltage $V''_1$ is passed through the fixed coil 201 while the voltage $V_2$ is passed through both of the rotatable coils 202 and 203 in quadrature, this being accomplished by inserting a resistance 204 in series with coil 202 and an inductance 205 in series with coil 203. If desired the phase angle meter 200 may be a phase angle recorder such as, for example, one of the type shown in Fig. 4 of the article by Forbes and Searing entitled "Voltage and load control" published in Electrical Engineering, June 1934.

When it is desired to obtain constant phase shift on several line circuits which are exposed to the same condition, for example, several circuits of the same cable, it is possible to apply the arrangement of Fig. 1 in a slightly different way. This is also applicable to arrangements subsequently described herein. One line circuit which might be termed a pilot circuit would be used in connection with a single bridge and rebalancing mechanism and this mechanism would serve to correct the phase on a number of other circuits.

Fig. 5 shows an arrangement for obtaining substantially perfect correction of variations of phase change introduced in a transmission line. This arrangement is applicable alike to both cable and open-wire lines and to low or high frequencies. Fig. 5 shows an arrangement employing alternating current for the automatic compensation of phase change variations of a line in which the alternating current method above mentioned is employed. A pilot current of the same frequency is transmitted between two points in opposite directions over the same line, using hybrid coils, for making comparisons of the phase relationship of currents or voltages existing at the two different points. Stations A and B at distant points include the sources 10 and 210, respectively, for generating alternating current of low frequency and by the arrangement shown the phase angle between the two currents or voltages is indicated and can be employed for purposes of load control. In this arrangement variations in the phase shift of the line 100 are automatically compensated through the agency of a balanced rectifier and relay 30 which causes the operation of adjusting mechanism 40 which in turn controls phase angle adjusters 50 and 60 in accordance with the action of the balanced rectifier 30. Alternating current from source 10 at station A after passing through current limiting resistances 11, the phase adjuster 50 and hybrid coil 120 having a balancing network 121 is transmitted over the line 100 to station B where a part of the incoming energy is taken off through hybrid coil 220 having a balancing network 221 and after being amplified in amplifier 290 which should be designed for constant phase shift is returned to the line through a conjugate pair of terminals of hybrid coil 220. At station A a part of the returned energy is withdrawn from the line 100 through hybrid coil 120 and after passing through phase adjuster 60 is applied to the common grid connection of the balanced rectifier 30. Also, alternating current from the source 10 after passing through current limiting resistances 12 and phase compensator 70 is applied to the balanced rectifier 30. This rectifier arrangement has the well-known property that when the two inputs differ in phase by 90 degrees, or more generally by $n\pi/2$ where $n$ is any integer, the outputs of the two rectifier tubes will be equal. This is true regardless of the relative amplitudes of the two inputs. If, however, the 90 degree phase relationship between the inputs is altered, the polar relay 36 will operate in one direction or the other depending on the direction of the phase difference. The operation of this polar relay controls the operation of adjusting mechanism 40 which may be similar to that shown in Fig. 2. The operation of this adjusting mechanism in turn simultaneously adjusts the phase adjusters 50 and 60 to restore the condition of balance. Assuming that the changes in phase shift are the same for either direction of transmission over the line, the phase shift introduced by the phase adjusters 50 and 60 should be made equal. It will then be evident that as long as a condition of balance holds at station A, the phase of the received currents or voltages at station B will always have the same relationship to that of station A. The total range of adjustment of each of the variable phase adjusters 50 and 60 must be as great as the maximum variation of the phase shift of the line. The phase compensator 70 may be employed to initially obtain the desired 90 degree phase relationship between the two inputs to the balanced rectifier 30. The phase angle difference between the alternating currents or voltages generated by sources 10 and 210 at the two stations A and B, respectively, is shown by the phase angle meter 200. Alternating current from the source 10 after being transmitted over the compensated line 100 is impressed on one side of the phase angle meter 200 and alternating current from the source 210 is impressed upon the other side of the phase angle meter. High resistances 211 may be inserted in the leads from the compensated line at station B to provide the necessary impedance to prevent losses to the line by the connected terminal apparatus. A phase compensator 270 may be inserted to provide a phase shift opposite to the phase shift introduced by the line so that the total phase difference between the currents or voltages of the sources 10 and 210 may be read directly. However, this phase compensator 270 may be omitted and if desired the receiving apparatus calibrated accordingly. In order to determine the amount of phase shift to be provided by the phase compensator 270, it is necessary to know the phase shift of the line. This may be obtained from computations based on the fundamental constants of the circuit or measurements of the phase change may be made by employing one of the various methods referred to in describing Fig. 1.

Fig. 6 diagrammatically shows the well-known hybrid coil type line repeater which may be used in the line circuit 100. One or more of these or other suitable types of repeaters may be used in various arrangements here described.

If it is desired to employ the phase comparisons obtained with the arrangement of Fig. 1 or Fig. 5, as a basis for automatically controlling the load distribution on a system, this can be done by means of the arrangement shown in Fig. 7 which may be substituted for the phase angle meter shown in Figs. 1 and 5, the circuit connections being made at the point indicated by the dash-dot line X—X at station B.

Fig. 7 shows an automatic load control arrangement. It employs a balanced rectifier phase comparison arrangement 238 similar to that shown at station A in Fig. 5 which in this case is used at station B for actuating an adjusting mechanism which in turn controls tap changers or other load control equipment 280 of a power system or generator 210. The adjusting mechanism 240 may be of the continuous control type such as shown in Fig. 2 or it may be a step-by-step control device, many types of which are well-known. Such an automatic arrangement may be used in conjunction with an arrangement for phase angle control between two intermediate power systems.

Fig. 8 shows a compensation arrangement employing two pilot lines, an outgoing and a returning pilot line. This shows an arrangement also employing alternating current for the automatic compensation of phase change variations of a line in which a single pilot current of the same frequency is transmitted between two points in opposite directions over two different lines and it also shows how the arrangement may be employed to obtain comparisons of the phase relationship of currents or voltages at two different points. Stations A and B at distant points are provided with sources 10 and 210, respectively, for generating alternating current of the same frequency. In this arrangement the variations in the phase shift of the outgoing line circuit 100 and the returning line circuit 101 are automatically compensated and held substantially constant through the agency of a balanced rectifier and relay 30 which causes the operation of an adjusting mechanism 40 which in turn controls the phase angle adjusters 50 and 60 in accordance with the action of the balanced rectifier 30. Alternating current from the source 10 at station A passes through current limiting resistances 11 and phase adjuster 50 for transmission over the line 100 to station B and back over the return line 101 to the phase adjuster 60 and thence to the balanced rectifier 30 at station A. The balanced rectifier 30 and the adjusting mechanism 40 are similar to those shown in detail in Figs. 5 and 2, respectively. Current from the source 10 at station A is also fed through current limiting resistances 12 and phase compensator 70 to the balanced rectifier 30. The operation of the balanced rectifier causes the adjusting mechanism 40 to simultaneously operate the phase adjusters 50 and 60 so as to restore the condition of balance and thus automatically compensate the lines 100 and 101 interconnecting stations A and B. The phase compensator 70 may be employed to obtain initially the desired 90 degree phase relationship between the two inputs to the balanced rectifier 30. The phase angle adjusters 50 and 60 must be of ample range to compensate for both lines. The action of the phase adjusters and the balanced rectifier is similar in this arrangement to that described more in detail for Fig. 5. The phase angle difference between the alternating currents generated at the two stations is shown by phase angle meter 200. Current from source 10 after being transmitted over compensated line 100 is impressed upon phase angle meter 200 at the same time that current from source 210 is impressed upon the phase angle meter. High resistances 211 in the leads from the compensated line to the terminal apparatus prevent this apparatus from affecting transmission over the pilot lines. A phase compensator 270 may be inserted to provide a phase shift opposite to the phase shift introduced by the pilot line 100.

In the arrangements so far described, the pilot currents employed are the same frequency for opposite directions of transmission or in other words, for both directions of transmission. However, in some instances it may be advantageous to employ different frequencies for opposite directions of transmission. Fig. 9 shows an arrangement in which this is possible. This figure shows an arrangement employing alternating current for the automatic compensation of phase change variations of a line using filters, in which a pilot current of different frequencies is transmitted between two points in opposite directions over the same line and this figure also shows how the arrangement may be employed to obtain comparison of phase relationship of currents or voltages at the two different points. In this case a frequency $f_1$ is transmitted over the line to the receiving end and a harmonic derived from this frequency, for example $2f_1$, is returned to the transmitting end where its phase is compared with that of the same frequency derived locally from the original source. In this case the phase adjusters 50 and 60 are not alike and each must correct for phase change variations at the particular frequency transmitted through it. While it would be possible with this arrangement to use hybrid coils to separate the oppositely directed currents, the use of different frequencies in opposite directions makes it possible to employ filters instead of hybrid coils at the terminals and repeaters. Stations A and B at distant points are provided with sources 10 and 210, respectively, for generating alternating currents of frequency $f_1$ whose phase relationship is to be compared and by means of the arrangement shown the phase angle between the two currents or voltages is indicated. In this arrangement variation of the phase shift of line 100 is automatically compensated through the agency of the balanced rectifier and relay 30 which cause operation of adjusting mechanism 40 which in turn controls phase angle adjusters 50 and 60 in accordance with the action of balanced rectifier 30. Alternating current from source 10 at station A after passing through current limiting resistances 11, phase adjuster 50 and filter 51 transmitting frequency $f_1$, the same as that from source 10, is transmitted over the line 100 to station B where a part of the incoming energy is taken off through filter 251 transmitting frequency $f_1$ and after being amplified in amplifier 290 is transmitted to harmonic generator 260 from which a harmonic of this frequency is derived, for example $2f_1$, which is transmitted through filter 261 back to the line 100 and to station A. At station A the returned energy is withdrawn from the line 100 through filter 61, transmitting frequency $2f_1$ and after passing through phase adjuster 60 is applied to the common grid connection of balanced rectifier 30. Also current from the source 10 is transmitted through current limiting resistances 12 to harmonic generator 20 where a harmonic frequency $2f_1$ is derived which is transmitted by filter 21 passing frequency $2f_1$ through phase compensator 70 to the balanced rectifier 30. The operation of balanced rectifier 30 controls the operation of adjusting mechanism 40 which causes phase adjusters 50 and 60 to operate to restore the condition of balance and thus automatically compensate the line 100 for changes in phase shift. In this arrangement a harmonic of the pilot current frequency is impressed upon both sides of the balanced rectifier instead of a current of the original pilot frequency. Current from source 10 after being transmitted over compensated line 100 is also impressed upon one side of phase angle meter 200 and current from source 210 is impressed upon the other side of the phase angle meter 200, and the phase angle difference between the current or voltages generated at the two stations A and B is shown by this phase angle meter. High resistances 211 are in the leads connecting the compensated line and the terminal apparatus to limit transmission losses due to the bridged apparatus. A phase compensator 270 may be inserted to provide a phase shift opposite to the phase shift introduced by the line.

Fig. 10 shows the well-known filter type line repeater, particularly applicable for use with the arrangement shown in Fig. 9. One side of the repeater transmits frequencies of $f_1$ and the other side frequencies of $2f_1$ or any other harmonic $nf_1$ of the fundamental frequency $f_1$ which may be selected or used. Such repeaters are well known in the communications and signalling art.

Fig. 11 shows an arrangement employing alternating current for automatically compensating a two-wire line for phase change variations between two points arranged for making successive phase comparisons of the voltages of all three phases of a power system or systems. At the two points between which the compensated power line extends, synchronous switching mechanism is used to connect in one phase after another at each point. In this arrangement the automatic compensating equipment at stations A and B may be similar respectively to that shown in Fig. 5 or 9 for compensating the pilot line 100. Connection with the power lines or systems at the two stations is made through synchronous switches arranged for making connections in succession with the different phases of the power systems. As here illustrated the terminal apparatus at each station is connected with the power system circuits through suitable protective condensers and resistances to keep the power currents off the pilot line and its terminal apparatus. At station A the three-phase power circuit 510 is tapped by three leads through protective condensers 521, 522 and 523 and respective series resistances 525, 526 and 527 in each lead to connect the different phases A, B and C with the synchronous switch 310 which connects through the automatic phase compensating equipment 99 with the compensated pilot line 100 leading to station B. At station B the three-phase power circuit 610 is connected by three leads through protective condensers 621, 622, 623 and respective series resistances 625, 626 and 627 in each lead to connect the different phases A, B and C of the power circuits through respective phase angle meters 200A, 200B and 200C. These are in turn connected with the compensated line 100 through the automatic phase compensating equipment 299 and the synchronous switch 410. The synchronous switches at the two stations A and B may be of any well-known type and operated in synchronism by any suitable means, not shown in the drawing, to connect the different corresponding phases of the power systems at the two stations for making phase angle comparisons. Current from each phase of the power system at station A, after being transmitted over the compensated line 100, is successively impressed upon the phase angle meters 200A, 200B and 200C of the respective phases A, B, and C for making the phase comparisons with the currents or voltages of the power system at station B which is also successively impressed upon the phase angle meters. In this arrangement the automatically compensated pilot line 100 and the terminal apparatus at each station makes it possible to compare the phase angle difference of the currents or voltages in the respective phases of the two power systems at any time by operating the synchronous switches at the two stations manually or they may be continuously operated automatically at such a speed as to permit continuous readings on the phase angle meters.

In the arrangements so far discussed, two-wire pilot lines have been employed without recourse to multi-channel carrier current operation and phase comparisons were thus limited to comparing single phase circuits or sources at a time so that when polyphase systems were involved the comparisons were necessarily made in succession as shown in Fig. 11.

Fig. 12 shows an arrangement for making phase comparisons of each of the three phases of a power system or system simultaneously. This figure shows an arrangement employing alternating current for automatically compensating a three-wire pilot line for phase change variations between two points arranged for simultaneous phase comparisons of the currents or voltages of all three phases of a power system or systems at the two points between which the three-wire compensated pilot line extends. Suitable coupling means are employed at the points to connect the three-wire pilot line with the power lines for simultaneously making phase relationship comparisons between all three phases of the power system or systems. One phase of the three-wire pilot line automatically controls the compensation of all of the three phases of the pilot line as, where the circuits of the three-wire pilot line are close together, one circuit may adequately serve to govern the compensation of all circuits as heretofore stated. The automatic phase compensating equipment here shown is of the filter type. As it is not practicable to connect the terminal apparatus directly to the power line some form of coupling must be employed as pointed out in describing Fig. 11. At station A leads from the power circuit 510 connect through condensers 221, 222 and 223 to the three-phase filter 530, transmitting frequency $f_1$, which in turn is connected to the three-phase pilot line 105. While current from the power line is transmitted over all three phases of the three-phase pilot line 105, the compensating apparatus is controlled by one phase of the pilot line as stated above. Alternating current from one phase of the power line, after transmission over one phase of the pilot line 105 and through three-phase filter 630, transmitting frequency $f_1$, is taken off at station B through modulator 264 and by means of oscillator 265 is stepped up to a different frequency $f_2$ and returned through filter 263 to the one phase of the pilot line and then over it to station A. The return frequency $f_2$ is passed by filter 63 to demodulator 64 from which current of frequency $f_1$ is transmitted to the balanced rectifier 30, while current of frequency $f_1$ from the power line at station A is passed through filter 22 which transmits frequency $f_1$ to phase compensator 70 and to the balanced rectifier 30. The balanced rectifier controls the operation of the adjusting mechanism 40 which in turn drives the phase adjuster 80 which operates on all three phases of the pilot line 105, thus automatically compensating each circuit of the pilot line. The pilot line and phase adjuster should have a phase change which is linear with frequency since the pilot line transmits current in opposite directions of different frequencies. High resistances 112 and 113 at station A, and 114 and 115, and also 116 and 117 at station B serve to balance the two phases of the pilot line which are not connected to the automatic compensating equipment. At station B phase angle meters 200A, 200 B and 200C are connected through phase compensator 670 with the different phases of the compensated three-phase pilot lines 105 and through condensers 621, 622 and 623 to the corresponding phases of the power system 610. The phase angle meters, therefore, show at all times the phase relationship of the currents or voltages in the different phases of the circuits of the power systems 510 and 610. The return frequency $f_2$ over one of the phases of the pilot lines 105 may have a harmonic relationship to the frequency of the power line current or it may be of any other suitable frequency. Subsequently an arrangement will be described herein in which the power lines are used for transmitting the compensating currents and for operating the compensating apparatus as well as transmitting the power current.

It may happen in some instances that the line is not adaptable to transmitting low frequencies or it may be desirable for some other reason to employ high frequency transmission over the pilot line.

Fig. 13 shows an arrangement employing carrier current for automatic compensation of phase change variations of a line in which a pilot current consisting of a carrier current modulated by a low frequency current is transmitted between two points in opposite directions over the line and illustrates how the arrangement can be employed for making comparisons of the phase relationship of independent currents or voltages at two different points. The arrangement for achieving the automatic compensation of phase change variations of the pilot line is shown as similar to Fig. 5 but modified to employ a carrier current. At station A alternating current of frequency $f_1$ from source 10 modulates in modulator 91 a carrier current generated by oscillator 90 and the upper (or lower) side-band frequency is transmitted through filter 92, phase adjuster 50, hybrid coil 120 and high-pass filter 118 to the pilot line 100. As the pilot line 100 here shown is a section of a telephone circuit, the above-mentioned currents in reaching the pilot line pass through high-pass filter 118 which prevents the telephone signals on the pilot line reaching the terminal apparatus. The telephone circuit is continued through low-pass filter 119. At station B the pilot line connects with the terminal apparatus through high-pass filter 218 and with the telephone circuits through low-pass filter 219. At station B a part of the high frequency current is amplified and returned by means of hybrid coil 220 over the pilot line 100 to station A where it passes through phase adjuster 60, demodulator 80 and filter 65, which passes only currents of the same frequency $f_1$ as that of source 10 to the balanced rectifier 30. The low frequency source of current 10 transmits frequency $f_1$ through the phase compensator 70 to the other side of the balanced rectifier 30. The balanced rectifier controls the adjusting mechanism 40 which in turn operates the phase adjusters 50 and 60 to automatically compensate the pilot lines 100 in a manner similar to that explained more in detail in the description of Fig. 5. At station B connection is made with the compensated line through high resistance 211, phase compensator 270, demodulator 291, filter 265 passing a frequency $f_1$ to the phase angle meter 200. The phase angle meter 200 is also connected to a source of current 210 having a frequency $f_1$ whose phase relationship is to be compared with that of the current from source 10. Thus the phase angle meter 200 indicates the phase relationship between these two sources. This figure and subsequent figures show various arrangements employing carrier current for compensating a pilot line and various applications of such compensated lines to indicate phase relationship and to compare the phase relationship of the currents or voltages of power systems.

While the carrier current arrangement shown in Fig. 13 as in subsequent figures shows two phase adjusters at station A, it is possible to use only one adjuster in certain of the carrier current arrangements. Fig. 12 shows a single phase adjuster and the arrangement in that figure may be considered a partial carrier current system in that the returned current modulates a carrier frequency. In this case the phase adjuster must adjust for currents in both directions of transmission. Since the phase change of a line will be practically linear with frequency, a single phase adjuster incorporating corrective phase change for both frequencies may be employed.

Fig. 14 shows an arrangement employing carrier current for automatic compensation of phase change variations of a line in which the pilot current in one direction consists of the carrier current modulated by a low frequency current and in the opposite direction of the harmonic frequency of the carrier current thus using carrier currents of different frequencies for the transmission in opposite directions over the line and also illustrates how this arrangement can be employed for making comparisons of phase relationships of independent currents or voltages at two different points. Fig. 14 is similar to Fig. 13 except that the returned current is a harmonic of the transmitted current and filters instead of hybrid coils are employed for separating the two currents. In this arrangement a frequency $f_1$ supplied by source 10 modulates in modulator 91 a carrier frequency $f_2$ supplied by oscillator 90 and the upper (or lower) side-band is transmitted by filters 92, 93 and 118 to the pilot line 100. The current upon reaching station B is transmitted by filters 218 and 251 and amplifier 290 to harmonic generator 260. The returned harmonic frequency may be $2(f_1+f_2)$. It is transmitted back to station A through filters 261, 218, 118 and 61 to phase adjuster 60 and to one side of the balanced rectifier 30. At station A part of the upper sideband current from modulator 91 and filter 92 is impressed upon harmonic generator 20 and the harmonic component having a frequency $2(f_1+f_2)$, the same as that returned over the pilot line 100, is passed through filter 21 and phase compensator 70 to the other side of the balanced rectifier 30. The balanced rectifier 30 in turn controls the operation of the adjusting mechanism 40 which operates phase adjusters 50 and 60 to automatically maintain compensation of the pilot line 100. At station B a part of the transmitted current is also passed through high resistance 211, phase compensator 270, demodulator 291 and filter 265 which transmits current having a frequency $f_1$ to the phase angle meter 200. A source of current 210 having the frequency $f_1$ is connected to the other side of the phase angle meter 200 and the relative phase displacement of the currents or voltages generated by sources 10 and 210 is shown on this phase angle meter at station B.

Fig. 15 shows an arrangement employing carrier current for automatically compensating a pilot line for phase change variations between two points of a power system in which the carrier current modulated by the power current is transmitted over the automatically compensated pilot line and in which synchronous switching mechansim is used to connect in one phase after another of the power circuits for making phase comparisons of the power currents or voltages at two different points. This figure illustrates the application or use of a compensated pilot line for making phase comparison of poly-phase power systems and at the same time using the pilot circuit for another purpose such as a telephone circuit. The automatic phase compensating equipment 99 and 299 at stations A and B, respectively, may be the same as shown in other drawing figures such as Fig. 13 or Fig. 14, the compensating apparatus being shown within the rectangular dot-dash line in those figures. A carrier frequency $f_2$ is supplied by oscillator 90 at station A. The synchronous switching mechanisms 310 and 410 at stations A and B respectively, which connect with the poly-phase power systems 510 and 610, respectively, each transmit the same frequency $f_1$, at the two stations and with the compensated pilot line may be similar to the arrangement shown in Fig. 11. At station B phase angle meters are shown for each phase of the power circuit 200A, 200B and 200C for phases A, B and C, respectively of the power systems. By means of the synchronous switching arrangement the relative phase difference between the corresponding phases of the two systems may be successively measured on the respective phase angle meters. One phase angle meter might be used by positioning it in the common circuit between the automatic phase compensating apparatus 299 and the synchronous switch 410.

Fig. 16 shows an arrangement employing carrier current for automatically compensating a pilot line for phase change variations between two points in which three different frequency carrier currents modulated by the power currents of the different respective phases of the power system are transmitted over the automatically compensated pilot line for simultaneously making phase comparisons of the power currents or voltages. Each phase of the power circuit 510 employs individual automatic phase compensating equipment 99A, 99B and 99C, respectively. This compensating equipment may be similar to that shown within the dash-dot line at the station A of Fig. 13 or 14. Carrier currents of different frequencies $f_2$, $f_3$, and $f_4$ are supplied by sources 90A, 90B and 90C, respectively, for each of the different phases of the power system having a frequency $f_1$. Connection is made with the pilot line 100 through suitable filters 93A, 93B and 93C for each of the three phases, respectively. If the automatic compensating arrangement is similar to that shown in Fig. 13, these filters transmit frequencies $(f_1+f_2)$, $(f_1+f_3)$ and $(f_1+f_4)$, respectively. While if the automatic phase compensating equipment is similar to that shown in Fig. 14, these filters transmit frequencies $(f_1+f_2)$ and $2(f_1+f_2)$, $(f_1+f_3)$ and $2(f_1+f_3)$, and $(f_1+f_4)$ and $2(f_1+f_4)$, respectively. At station B the automatic phase compensating equipment 299A, 299 and 299C for the respective phases of the power system may be similar to that shown in Fig. 13 or 14. Respective filters 293A, 293B and 293C connect the automatic phase compensating equipment of the different phases with the compensated pilot line 100. Phase angle meters 200A, 200B and 200C in the respective phases A, B and C of the three-phase power system 610 having a frequency $f_1$ continuously show the relative phase difference of the corresponding phases of the two power systems 510 and 610. With three carrier currents of different frequencies, it is possible to determine the phase relationship of a plurality of phases simultaneously and continuously as shown by this arrangement instead of successively as shown in Fig. 15 where synchronous switches are used at stations A and B.

Fig. 17 shows an arrangement employing carrier current for automatically compensating a three-phase pilot line for phase change variations between two points arranged for making phase comparisons of the currents or voltages of all three phases of a power system at two different points in which three different carrier currents are modulated by the power current of the different respective phases of the power system and are transmitted over the respective phases of the automatically compensated three-phase pilot line for simultaneously making phase comparisons of the power currents or voltages. In this arrangement the three-phase compensated pilot line is employed between stations A and B and each phase of this pilot line is compensated simultaneously and continuously. Separate automatic phase compensating units 99A, 99B and 99C are used with each phase of the pilot line 105 at station A which may each be similar to that shown in Fig. 13 for compensating a two-wire pilot line. At station B also separate automatic phase compensating equipment units 299A, 299B and 299C are used with each phase of the pilot line 105. The terminal apparatus at each station may also be similar to that shown in Fig. 13 and is here schematically shown in some detail for phase A at station A and for phase C at station B. At station A oscillators 90A, 90B and 90C supply carrier frequencies for each phase of the compensating equipment. The carrier frequencies for each phase may be the same but it is preferable to use three different frequencies $f_2$, $f_3$ and $f_4$ for the three different phases respectively. The three phases of a power line 510 are properly connected to the terminal apparatus at station A and the three phases of a power line 610 are properly connected to the terminal apparatus at station B. This frequency of the current on the power system is $f_1$. At station B phase angle meters 200A, 200B and 200C continually show the phase relationship of the currents or voltages in the two power systems 510 and 610 for the respective phases of the two systems. In the drawing at station A three different oscillators have been shown each providing a different frequency carrier current. However, one oscillator providing a carrier current of the same frequency for all three phases of the compensating equipment might be used as stated above but in this case each circuit of the pilot line should be better balanced than in the case where three different frequencies are used.

Fig. 18 shows an arrangement employing carrier current for automatically compensating one phase of a three-phase power line for phase change variations between two points in which the compensation is achieved by transmitting a modulated carrier current in opposite directions over the compensated one phase of the power line wires and arrangements at one point for making comparisons of phase relationship of currents or voltages at the two different points. The terminal equipment in this arrangement is quite similar to that of Fig. 13 except that one phase of the power line is employed for the pilot transmitting medium instead of a separate pilot line. In either arrangement the pilot line circuit is used for other purposes, namely, in Fig. 13 it is used for telephony or other signaling, and in Fig. 18 it is also the circuit of one phase of the power system. Two of the wires or one phase of the three-phase power line 105 are used as the pilot circuit. Coupling condensers connect the two wires used as the pilot line to the terminal apparatus at stations A and B. The condensers must be capable of withstanding the power line voltages but at the same time provide a high impedance to the power frequency and a low impedance to the carrier frequency, as heretofore stated. In addition to prevent reflection and to isolate the apparatus from the effects of switching on the power circuit, it is desirable to include at each end of the pilot line chokes 106 and 107, and 206 and 207, respectively, in series with the power line wires. Each choke may be tuned with a capacitance to make it anti-resonant to the pilot frequency. The automatic phase compensating apparatus at stations A and B may be similar to that shown in Fig. 13 and is here so shown. Alternating current of frequency $f_1$ from source 10 modulates in modulator 91 a carrier current of frequency $f_2$ from oscillator 90 at station A and the sum (or difference) of these currents is transmitted over the pilot line and returned to cause the automatic compensation of the pilot line as explained in connection with Fig. 13. Alternating current of frequency $f_1$ from source 210 at station B is impressed upon one side of the phase angle meter 200 and a part of the current transmitted from station A to station B is transmitted to demodulator 291 and in turn that having a frequency of $f_1$ to the other side of the phase angle meter 200. Thus the phase relationship of the currents or voltages generated at station A by source 10 and at station B by source 210 are compared by the phase angle meter 200.

Fig. 19 shows an arrangement employing carrier current for automatically compensating one phase of a three-phase power line for phase change variations between two points in which compensation is achieved by transmitting a modulated carrier current in one direction and returning a harmonic frequency thereof over the compensated one phase of the power line wires and arrangements at one point for making comparisons of phase relationship of currents or voltages at the two different points. In this arrangement the automatic phase compensating equipment at station A and at station B is similar to that shown within the dot-dash boundary lines of Fig. 14 but arranged to employ two wires of one phase of a polyphase power line for the pilot line between the two stations. The automatic compensating equipment at station A and at station B is connected to one phase of the power line 105 at each station by means of suitable coupling condensers. These condensers must withstand the power line voltages and at the same time provide a high impedance to the power frequencies and a low impedance to the carrier frequencies. At each station choke coils 106, 107 and 108, and 206, 207 and 208, respectively, are inserted in series in the power line wires to prevent reflection and to isolate the terminal apparatus from the effects of switching on the power circuits. At station A alternating current of frequency $f_1$ from the source 10 modulates in modulator 91 a carrier current of frequency $f_2$ from the oscillator 90. The sum (or difference) components are transmitted over one phase of the power line 105 and a harmonic thereof is returned over the same pair of wires to the automatic compensating equipment at station A for compensating the pilot circuit as heretofore explained. At station B alternating current of frequency $f_1$ from source 210 is impressed upon the phase angle meter 200, while a part of the current transmitted from station A after being demodulated in demodulator 291 is impressed with a frequency of $f_1$ upon the other side of the phase angle meter 200. The phase angle relationship of the alternating currents generated by the two sources is shown by the phase angle meter.

Fig. 20 shows an arrangement employing carrier current for automatically compensating one phase of a three-phase power line for phase change variations between two points in which compensation is achieved by transmitting a modulated carrier current in opposite directions over one phase of the power line between the two points and in which synchronous switching mechanism is used to connect in one phase after another of the power circuits for making phase comparisons of the power currents or voltages of the three-phase system at the two different points. The automatic phase compensating equipment at each station A and B may be of any of the several types heretofore shown and as illustrated in this drawing figure it is similar to that shown in Fig. 13. This terminal equipment is connected at each station through suitable coupling condensers to two wires or one phase of the power line 105 and operates to automatically compensate this one circuit of the power line. Synchronous switching mechanism 310 and 410 at stations A and B, respectively, is arranged to connect in succession corresponding phases of the power system at the two stations. At station A current from the phase of the power system which is connected through the synchronous switch 310 modulates in modulator 91 a carrier current of frequency $f_2$ generated by oscillator 90 and carrier current components are produced for transmission over the two wires of the power system used as a pilot line to station B and a part returned for actuating the automatic compensating apparatus as described more in detail in the description of Fig. 13. The different phases of the power system or systems are connected as heretofore explained through suitable coupling condensers at each station to the respective synchronous switching mechanism. This synchronous switching mechanism may be of any well-known type. By this arrangement using a compensated one phase of the power line for a pilot line, the several phases of a power line or two different power systems transmitting currents having a frequency $f_1$ may have the phase relationships of their currents or voltages compared in the phase angle meter 200 at station B by successively connecting one phase after another of the power lines by means of the synchronous switches.

Fig. 21 shows an arrangement employing carrier current for automatically compensating for all three phases of a three-phase power line for phase change variations between two points in which compensation is achieved by transmitting three different suitably modulated carrier currents in opposite directions over the power line wires of each phase between the two points and arrangements at one point for simultaneously making comparisons of phase relationship of the currents or voltages in the different phases of the power circuits at the two different points. This arrangement is somewhat similar to that shown in Fig. 17 in which the pilot line is a three-phase signal circuit while in this case, the pilot line uses the circuits of a three-phase power system superimposing the automatic phase compensating on the power line at the same time the power line is transmitting its power currents. The automatic phase compensating apparatus 99A, 99B and 99C at station A and 299A, 299B and 299C at station B are connected through suitable protective coupling condensers to the different phases, A, B and C of the power line 105, respectively. Suitable choke coils are inserted in the power line wires to prevent reflection and to isolate the apparatus from the effect of switching on the power circuit as illustrated. The power line as here indicated is energized at each end with alternating current having a frequency of $f_1$ by suitable generators or input transformers, the details of which are not shown. The phase angle relationships of the two sources of power are continually shown in this arrangement by the phase angle meters 200A, 200B and 200C at station B. The three phases of the power line may be automatically compensated by any of the arrangements heretofore shown though the one illustrated is similar to that shown in Fig. 17. For each phase the power line current modulates a carrier frequency furnished by oscillators 90A, 90B and 90C of frequencies $f_2$, $f_3$ and $f_4$ for phases A, B and C, respectively. Components of modulation for each phase are transmitted over the power circuit and a part returned to the compensating equipment at station A, thus causing continual compensation of the power line circuits, so that the phase angle meters at station B continually show the phase relationship of the two sources of power at each end of the power line regardless of variations in phase change of the power line itself.

Fig. 22 shows an arrangement employing carrier current for automatically compensating one phase of a three-phase power line for phase change variations at three frequencies between two points in which compensation is achieved by transmitting three different modulated carrier current frequencies in opposite directions over the compensated one phase of the power line wires between the two points and arrangements at one point for simultaneously making comparisons of the phase relationship of the currents or voltages of the different phases of the three-phase power circuits at the two different points. In Fig. 21 an arrangement was shown for making phase relationship comparisons simultaneously of all three phases of a power system between two different points by compensating all three phases of the power line circuits and also using them as pilot line circuits. In Fig. 19 an arrangement is shown for using two wires or one phase of a three-phase power line as the compensated line for making phase relationship comparisons of currents or voltages at two different points on all three phases of the power line. Fig. 22 compensates two wires or one circuit of the power line between two points at three different frequencies and provides for simultaneously making the phase relationship comparisons on all three phases of a power system or systems for two different points. The phase compensating equipment at each station A and B may be the same as shown for example in Fig. 19 where the filter type is used or the same as is used in Fig. 21 where the hybrid coil type is used. The automatic phase compensating apparatus 99A, 99B and 99C at station A and 299A, 299B and 299C at station B are connected through suitable protective coupling condensers to one pair of wires or one phase of the power line 105. Sutiable choke coils as previously described are inserted in the power line wires to prevent reflection and to isolate the apparatus from the effect of switching on the power circuit. The power line as here indicated is energized at each end by alternating current of frequency $f_1$ by suitable generators or through input transformers, the details of which are not shown. Balancing high resistances 112 and 113 at station A and 116 and 117 at station B connect the third wire of the three-phase power line 105 with the two wires used directly in the automatic compensation of the pilot line to preserve impedance relationship. Oscillators 90A, 90B and 90C at station A provide respective carrier currents of different frequencies $f_2$, $f_3$ and $f_4$ for the three compensated channels over the two-wire pilot line using the circuit of one phase of the power system. At station A each phase of the power line current modulates one of the mutually exclusive carrier current frequencies furnished by the above-mentioned oscillators, respectively. The desired component of modulation for each phase is transmitted over the pilot line to station B and the different frequencies operate the respective units for the phases A, B and C at station B. At station B current from the power line of each phase is impressed upon one side of the phase angle meters 200A, 200B and 200C, while current from station A transmitted over the respective carrier current channels is impressed upon the other side of the respective phase angle meters. Thus the phase angle relationship of the currents or voltages at the two points are continually shown for each phase of the power system by the respective phase angle meters.

In the several drawing figures the source of alternating current 10 and 210 may be of small power such as merely a source of alternating potential or of large power such as electric power systems.

Fig. 23 shows an arrangement employing carrier current for automatically compensating for phase change variations of pilot lines interconnecting radio broadcast stations for achieving phase synchronization of broadcast transmitters employing common frequency carrier current. Any of the arrangements described herein might be employed to maintain identical phase of carrier frequency at two or more common frequency broadcast stations and an arrangement for this purpose is diagrammatically illustrated in Fig. 23. In this arrangement a base frequency is employed which is transmitted over the pilot line, and harmonic generators are used to convert the base frequency to that of the radio transmitters. However, the radio frequency employed by the transmitter may be transmitted directly over the line. Since this arrangement operates in accordance with the general method already described, the phase correcting equipment is here merely indicated at each end of the circuit. This equipment is of course different at the receiving end from that at the transmitting end of each line section and both transmitting end and receiving end equipment are required for every line section between radio transmitters. In Fig. 23 four broadcast stations A, B, C and D are shown. An oscillator 1100 supplies a base frequency to each of the distant stations over interconnecting automatically compensated pilot lines 100B to broadcast station B, 100C to broadcast station C and 100D to broadcast station D. As the source of the base frequency is located at station A, the connection is so short that no automatically compensated line is required to connect with it. Each broadcast station is connected with the automatically compensated pilot line to obtain a base frequency from source 1100 which by suitable means such as harmonic generators is stepped up to the broadcast frequency. Respective harmonic generators 1020—A—B—C—D through respective filters 1010—A—B—C—D supply the broadcast carrier frequency to the radio broadcast stations 1000A—B—C—D, respectively. Thus the carrier frequency of each broadcast station is in exact synchronism and phase since the base frequency is transmitted to all over pilot line 100 which is automatically compensated for phase shift. From the source of base frequency 1100 automatically compensated pilot line sections 100B and 100D extend to broadcast stations B and D and pilot line section 100C extends from station B to station C. At the transmitting and the receiving ends of these line sections are located phase correcting equipment 1100B and 1200B for line section 100B, phase correcting equipment 1100D and 1200D for line section 100D and phase correcting equipment 1100C and 1200C for line section 100C. The compensating equipment at each end of the several sections of the pilot line automatically and continuously make the necessary phase corrections so that the pilot line is always compensated for phase displacement. In broadcast transmission not only is the maintenance of such proper synchronism of carrier frequencies desirable but it is also very important that phase displacement be avoided and the above arrangement is designed to accomplish both of these features.

Reference is made to a divisional application, Serial No. 433,712, filed March 7, 1942, and directed particularly to features of the invention involving polyphase power systems.

While the several figures of the drawings show various modifications and adaptations of this invention, it is to be understood that the general principles disclosed herein may be embodied in other organizations widely different from those illustrated without departing from the spirit of the invention as defined in the claims.

What is claimed is:

1. The method of automatically holding the phase change of a transmission line constant which comprises transmitting an alternating current of one frequency over the line from the near end to the far end and back over the line from the far end to the near end, and automatically balancing the phase of the returned current with that of the current as originally transmitted adjusted to include the normal phase shift of the line.

2. The method of automatically holding the phase change of a transmission line constant which comprises transmitting a carrier current modulated by an alternating current of one frequency over the line from the near end to the far end and back over the line from the far end to the near end, demodulating the returned modulated carrier current, and automatically balancing the phase of the demodulated current with that of said modulating current.

3. The method of automatically holding the phase change of a transmission line constant which comprises transmitting a carrier current modulated by an alternating current of one frequency over the line from the near end to the far end and back over the line from the far end to the near end, demodulating the returned modulated carrier current, and automatically balancing the phase of the demodulated current with that of said modulating current shifted in phase by an amount equal to the normal phase shift of the line.

4. An arrangement for automatically compensating for variations in phase change of a line comprising an alternating current generator, a near-end hybrid coil with its associated network connecting said line with said generator for transmitting said current to said line, a far-end hybrid coil with its associated network terminating the far end of said line and having its oppositely conjugate terminals connected to return part of the transmitted current to the near end of the line, means connected with the terminals of said near-end hybrid coil conjugate to the line terminals and with said generator and responsive to current from said generator and to current returned over said line to develop a current measuring the phase difference between said currents, and phase adjusting means responsive to the current developed by said first-mentioned means to adjust the phase of the current from said generator delivered to said line and that of the returned current delivered from said line to said first-mentioned means.

5. An arrangement for automatically compensating for variations in phase change of a line comprising an alternating current generator, a near-end filter network connecting said line with said generator for transmitting said current to said line, a far-end filter network terminating the far end of said line, a harmonic generator at the far end of said line controlled by the alternating current received over the line, a second far-end filter network connecting said harmonic generator with said line for returning an alternating current having a frequency different from that of the said received current, a second near-end filter network connecting with said line for transmitting the returned current therefrom, means connected with the output side of said second near-end filter network and with said near-end generator, and responsive to current from said generator and to current returned over said line to develop a current measuring the phase difference between the currents acting on said means, and phase adjusting means responsive to the current developed by said first-mentioned means to adjust the phase of the current delivered to said line from said generator and that of the returned current delivered from said line to said first-mentioned means.

6. An arrangement for automatically compensating for phase variations and phase change of a line and for continuously comparing the phase angle between two alternating voltages comprising a generator for producing one of said voltages, a near-end hybrid coil with its associated network connecting the near end of the line with said generator for transmitting said voltage to said line, a far-end hybrid coil with its associated network terminating the far end of said line and having its oppositely conjugate terminals connected to return part of the transmitted voltage to the near end of the line, means connected with the terminals conjugate to the line terminals of said near-end hybrid coil and with said generator and responsive to voltage from said generator and to voltage returned over said line, equalizing phase adjusting means controlled by said first-mentioned means connected in both of the circuits connected with the terminals conjugate to the line terminals of the near-end hybrid coil, a second generator for producing the second of said alternating voltages at the far end of the line, and means for measuring the phase angle between the voltage produced by said near-end and said far-end generators including a phase compensator and a phase angle meter connected between the terminals conjugate to the line terminals of said far-end hybrid coil and said far-end generator.

7. An arrangement for automatically compensating variations in phase change of a line comprising an oscillator for generating a carrier current, a second oscillator for generating an alternating current of a given frequency, a modulator for causing said alternating current to modulate said carrier current, a near-end hybrid coil with its associated network for transmitting said modulated current to said line, a far-end hybrid coil with its associated network terminating the far end of said line and having ts oppositely conjugate terminals connected to return part of the transmitted modulated current to the near end of the line, a demodulator at the near end of the line for demodulating returned modulated current, means controlled by the demodulated current and by current from the said second oscillator adjusted in phase to equal the normal phase shift of the line, said means developing a current measuring the phase difference between said demodulated current and current from said second oscillator, and phase adjusting means controlled by said first-mentioned means and responsive to the current developed by the latter to adjust the phase of the transmitted modulated current and of the returned modulated current.

8. An arrangement for automatically compensating variations in phase change of a line and for comparing the phase angle between two alternating voltages comprising an oscillator for generating a carrier voltage, a second source of alternating voltage of a given frequency, a modulator for causing said alternating voltage to modulate said carrier voltage, a near-end hybrid coil with its associated network connecting the near end of said line with said oscillator and with said second source of alternating voltage for transmitting currents to said line, a far-end hybrid coil with its associated network terminating the far-end of said line and having its oppositely conjugate terminals connected to return part of the transmitted currents to the near end of the line, a demodulator at the near end of the line for demodulating the return currents, automatic balancing means operated by the demodulated voltage and the alternating voltage from said second source of voltage adjusted in phase to equal the normal phase shift of the line, phase adjusting means controlled by said balancing means connected in both of the circuits connecting with respective pairs of terminals conjugate to the line terminals of the near-end hybrid coil, a source of alternating voltage of a given frequency at the far end of said line, and means including a phase compensator, a demodulator and a phase angle meter for measuring the phase angle between said near-end and said far-end alternating voltage sources.

9. An arrangement for automatically compensating for variations in phase change between the ends of a transmission line, comprising an alternating current source, means connecting said source with one end of said line for transmitting said current over said line to the other end of the latter, means at said other end for returning over said line to said one end of the line a portion of the current transmitted from said one end of said line, means connected to said line at the end to which said source is connected and adapted to respond to current from said source and to current returned over said line and to develop a current measuring the phase difference between the currents acting on said means, and phase adjusting means in the connection between said source and said line and between said line and said third-mentioned means, said phase adjusting means being controlled by said third-mentioned means.

10. The arrangement claimed in claim 9 including a phase shifting network connected between said source and said third-mentioned means to adjust the latter initially to include the normal phase shift of the line.

11. An arrangement for automatically compensating for phase variations and phase change of a line and for continuously comparing the phase angle between two alternating voltages, comprising a generator for producing one of said voltages, means connecting one end of the line with said generator for transmitting said voltage to said line, means for terminating the other end of said line and for returning a part of the transmitted voltage to the first-mentioned end of the line, means connected with the first-mentioned end of the line and responsive to voltage from said generator and to voltage returned over said line, equalizing phase adjusting means controlled by said third-mentioned means and connected between said generator and the line and between said third-mentioned means and the line, a second generator for producing the second of said alternating voltages at the second-mentioned end of the line, and means for measuring the phase angle between the voltage produced at said end of the line including a phase shift compensator and a phase angle meter connected to the line at its second-mentioned end.

12. An arrangement for automatically compensating for variations in phase change between the ends of a transmission line, comprising an alternating current generator, means connecting said generator with one end of said line for transmitting said current over said line to the other end of the latter, means at the said other end for returning to the said one end a portion of the current transmitted from the said one end of the line, means connected to said line at the end thereof to which said generator is connected and responsive to current from said generator and to current returned over said line, phase adjusting means controlled by said third-mentioned means in the connections between said generator and third-mentioned means and said line, a second alternating current generator connected to the said other end of the line, and a phase angle meter connected between said second generator and the line.

13. In combination, a plurality of sources of alternating current, a transmission line, means at one end of said line to connect it with one of said sources whereby current from the latter is transmitted to the other end of said line and a portion of the said current is returned to the said one end of the line, means at the said one end of the line responsive to current supplied directly from said source and to a portion of the current returned from the said other end of the line, said last-mentioned means maintaining substantially constant the phase shift between the ends of said lines, a phase angle meter, means connected between said meter and the said other end of the line to compensate for the normal phase shift introduced by said line in the current from said one source, and a connection from a second of said sources to said phase angle meter whereby the currents from said two sources are impressed on said meter simultaneously and a direct reading of the phase difference between said currents is obtainable.

14. In combination, a plurality of alternating current generators, a transmission line, means at one end of said line connected with one of said generators whereby current therefrom is transmitted to the other end of said line and a portion of the said current is returned to the said one end of the line, means at said one end of the line responsive to current supplied directly from said generator and to a portion of the current returned from the said other end of the line, said last-mentioned means maintaining substantially constant the phase shift between the ends of said line, a phase angle meter, means connected between said meter and the said other end of the line to compensate for the normal phase shift introduced by said line in the current from said one generator, and a connection from a second of said generators to said phase angle meter whereby the currents from said two generators are impressed on said meter simultaneously and a direct reading of the phase difference between said currents is obtainable.

ESTILL IBBOTSON GREEN.
NEWTON MONK.